United States Patent

Lazarow

[15] 3,636,701
[45] Jan. 25, 1972

[54] PARKING METER MASK

[72] Inventor: Boris Lazarow, 188 Betty Ann Drive, Willowdale, 444 Ontario, Canada

[22] Filed: May 21, 1970

[21] Appl. No.: 39,436

[52] U.S. Cl. .................................58/141, 194/DIG. 22
[51] Int. Cl. ..........................................G07c 1/30
[58] Field of Search ...................................58/141–143; 194/DIG. 22

[56] References Cited

UNITED STATES PATENTS 2,927,675  3/1960  Iapadre ........................... 194/DIG. 22
2,289,362  7/1942  Hickey ................................ 58/143

*Primary Examiner*—Richard B. Wilkinson
*Assistant Examiner*—Edith C. Simmons
*Attorney*—Westell & Hanley

[57] ABSTRACT

Masking plates applied to a conventional meter obscure the indicator position except at predetermined time intervals.

3 Claims, 3 Drawing Figures

PATENTED JAN 25 1972

3,636,701

INVENTOR.
BORIS LAZAROW
BY
Westell & Hanley

PARKING METER MASK

This invention relates to a device for modifying a parking meter to abscure to the viewer, the unexpired time. The advantage of such an arrangement is that a second user of a metered parking spot, arriving intermediate a time interval paid for by another, cannot be sure how much unexpired time remains on a masked meter. Thus the statistical tendency is much higher of the second user deposition additional coins to ensure avoiding a penalty.

Prior approaches to the hiding of unexpired time on the meters have had numerous disadvantages. These include:

a. complex moving masks involving modification of the parking meter machinery;

b. static masks mounted on the casing and difficulty of removal and in many cases requiring modification of the casing.

Applicant provides a mask in the form of a plate which may be removably mounted to occlude most portions of the parking meter indicator movement relative to a time scale, but which is static, and hence does not require modification of the meter mechanism and, on the other hand, does not require attachment to, modification of, or permanent disfigurement of, the parking meter casing.

The invention comprises laminar plates mountable by mounting means on the scale and thereby positioned relative to said scale and indicator, to be static relative to said scale and static during operations of the meter mechanism, and designed and positioned to occlude the position of said indicator relative to said scale, over most orientations of its travel relative to said scale; where said mounting means and plate are designed and constructed so that said plate allows movement of said indicator over said range relative to said scale.

In a preferred embodiment of the invention the plate (plates are provided on both sides if the meter may be so viewed) is designed and constructed so that, although the majority of the scale is occluded, gaps in the plate allow the viewer to observe indicator movement over small angular ranges spaced by the angular intervals corresponding to the coins used. For example, the unit coin may be a five cent piece and this coin provides a parking interval of (say) 15 minutes of time, and thus the user may insert combinations of nickels and dimes to provide for himself an interval which is an even multiple of fifteen minutes. In this event, the plate would be designed to expose the indicator movement at 15 minute intervals. Thus, for any number of nickels or dimes inserted, the gaps in the plate would allow the user to see the movement of the indicator across such a gap for each 5-cent value of the coins inserted. The example is not intended to be limiting and the plate using this principle would be varied to suit the coin units used, the number of coins for each unit and the scale.

In another preferred embodiment, and with or without the preferred feature of the last paragraph, the invention provides a device removably mountable directly on the scale. This arrangement, with the design arranged so that the plate allows proper movement of the indicator, allows addition and/or removal of the plate without interference with the mechanism or the casing.

In the drawings which illustrate a preferred embodiment of the invention:

Figure 1:
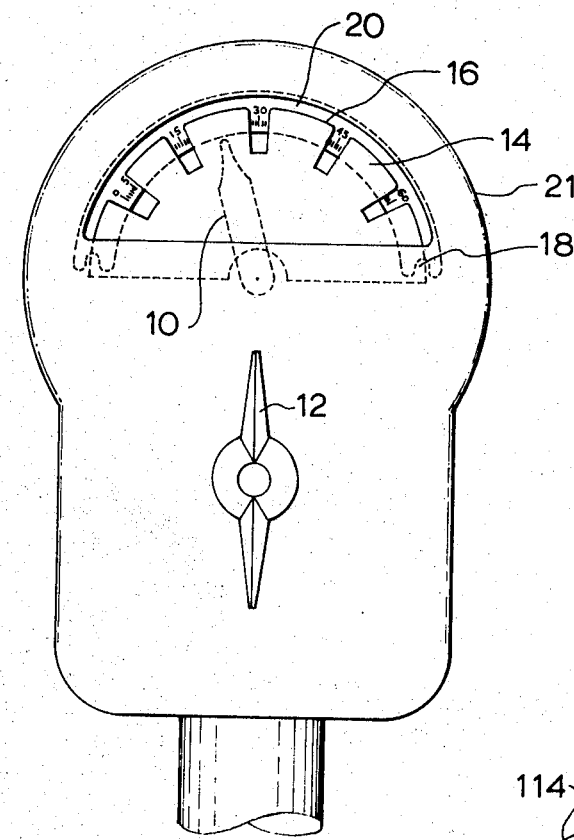
FIG. 1 shows a meter modified by a plate in accord with the invention, and one means for mounting the plate on the scale.

In the drawings, FIG. 1 shows an example of a parking meter with which the invention may be used although the invention may be used with all meters known to the inventor with suitable dimensional changes to allow for differing meter dimensions. As indicated, the meter comprises an arcuate scale having indications of minute intervals and within the inner radius of the scale an indicator 10 moves in accord with any of the well known means of operating a parking meter on the insertion of a coin, usually accompanied by the twisting of a lever or knob 12. The mechanism, scale and indicator is enclosed within a casing 21.

As shown in FIG. 1 a mask or plate 14 is provided defining an outer arc or edge 16 and having slots 18 at each end for mounting by bolts (not shown) on the indicator scale 20. It is noted that these bolts are already present to allow mounting of the plate on the meter. The slots 18 are there provided to correspond to the bolts on a popular type of parking meter but it will be appreciated that the bolt slots 18 may be located in any convenient location to be mounted on the dial mounting bolts or could be separately mounted on the dial with holes punched in the dial although this may usually be avoided. The outer periphery of the plate is provided with truncated outwardly opening sectors to expose a small arcuate range of indicator 10 movement at and adjacent the zero, 15-, 30-, 45- and 60-minute marks. This is on the assumption that the unit coins used will produce increments of 15-minute movement of the dial. If the increments were, for example, 10 minutes then the truncated sectors would be located at 10-minute intervals. Some meters may be viewed from both sides and some from one side only and it will be appreciated that plates will be provided on both sides of a meter which may be viewed from both sides.

It is of course important that the plates do not interfere with the indicator 10 movement and hence spacers would be inserted between the plates and the dial if this is necessary to ensure free handling. Each plate 14 should be designed to obscure the position of indicator 10 between slots but be spaced sufficiently to clear indicator 10 at all positions of the latter. If the spacing results in clearance between the inner surface of plate 14 and scale 20, these spaces are preferably either filled by padding in the locations analogous to those of strips 26 in FIG. 2 or the upper part of plate 14 is stepped in as shown with the alternative of FIG. 3. Also important is the fact that the plates attached in this or in the other embodiments do not affect the casing or require attachment thereto.

It will be noted that the plate between the sector portions may, but need not, obscure the scale 20, but must obscure the indicator 10, since if the indicator 10 is exposed, the minutes available could be estimated.

It is thus seen that with the construction shown, that unless the indicator is in the small angular arc near the 15-minute intervals the user cannot tell the amount of time remaining and in most cases will feel impelled to insert a coin. On the other hand, on the insertion of a unit coin and independent of the position of the indicator, the indicator will always be moved through an arc equal to a 15-minute interval in the example shown and thus will be seen to move across at least one of the truncated slots. Thus the user of the meter will be aware that the meter is working.

Figure 2:
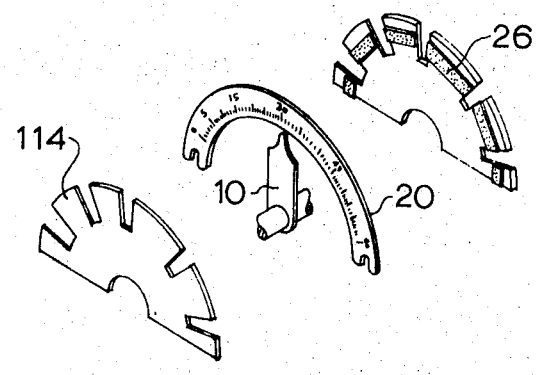
FIG. 2 shows an exploded view of two plates for a meter with an alternative method of mounting the plates on the indicator scale.

In the embodiment of FIG. 2 (where only the indicator dial 20 and indicator 10 of the meter are shown, but where the meter may be the same as that in FIG. 1); a mask or plate, here designated 114 is designed in the same manner and is used in the same manner as the plate in FIG. 1 but is mounted on the scale by contact adhesive pads 26 (which adhere to both the plate and the scale) well known to those skilled in the art, and the thickness of the contact adhesive pads will be adjusted to allow freedom of indicator movement.

Figure 3:
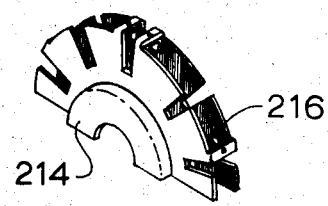
FIG. 3 shows a third method of mounting the plates on the indicator scale.

A third method of mounting the masks or plates, here designated 214, on the scale is to clamp these lightly on the dial by a spring clamp member 216 across the upper edge of the scale as illustrated in FIG. 3. It will be noted that the plate 214 is stepped inwardly at 216 to allow clearance from the indicator at the bottom but obscuring of the indicator position between slots at the top.

In all cases the masking function of the invention is achieved, without the modification of the mechanism or mounting or a modification of the meter casing.

I claim:

1. For use with a coin-actuated parking meter and including meters, with and without manual in addition to coin actuation, such meters having a scale, and an indicator movable over a predetermined range of orientations in relation thereto under control of a meter mechanism, to indicate in relation to said scale, unexpired parking time, the improvement comprising:

a removable plate, mountable by mounting means in relation to said scale and indicator, to be static relative to said scale during operations of the meter mechanism, and designed and constructed to occlude the position of said indicator relative to said scale over most orientations of its travel relative to said scale;

said mounting means and plate being designed and constructed so that said plate allows movement of said indicator over said range relative to said scale, wherein said mounting means is designed and constructed to mount said plate on said scale.

2. For use with a coin-actuated parking meter and including meters, with and without manual in addition to coin actuation, such meters having a scale, and an indicator movable over a predetermined range of orientations in relation thereto under control of a meter mechanism, to indicate in relation to said scale, unexpired parking time, the improvement comprising:

a removable plate, mountable by mounting means in relation to said scale and indicator, to be static relative to said scale during operations of the meter mechanism, and designed and constructed to occlude the position of said indicator relative to said scale over most orientations of its travel relative to said scale;

said mounting means and plate being designed and constructed so that said plate allows movement of said indicator over said range relative to said scale, wherein said plate is designed to allow viewing of the spacial relationship between said plate and said scale at angular intervals corresponding to the periods of parking time corresponding to coins acceptable to the meter.

3. For use with a coin-actuated parking meter and including meters, with and without manual in addition to coin actuation, such meters having a scale, and an indicator movable over a predetermined range of orientations in relation thereto under control of a meter mechanism, to indicate in relation to said scale, unexpired parking time, the improvement comprising:

a removable plate, mountable by mounting means in relation to said scale and indicator, to be static relative to said scale during operations of the meter mechanism, and designed and constructed to occlude the position of said indicator relative to said scale over most orientations of its travel relative to said scale;

said mounting means and plate being designed and constructed so that said plate allows movement of said indicator over said range relative to said scale, wherein said mounting means is designed and constructed to mount said plate on said scale, wherein said plate is designed to allow viewing of the spacial relationship between said plate and said scale at angular intervals corresponding to the periods of parking time corresponding to coins acceptable to the meter.

* * * * *